Oct. 19, 1948.  D. D. PAXTON  2,451,575
HYDRAULIC SELECTOR VALVE
Filed Feb. 20, 1946  5 Sheets-Sheet 1

Inventor
DONALD D. PAXTON
By R. S. Berry
Attorney

Oct. 19, 1948.  D. D. PAXTON  2,451,575
HYDRAULIC SELECTOR VALVE
Filed Feb. 20, 1946   5 Sheets-Sheet 2

Inventor
DONALD D. PAXTON
By
Attorney

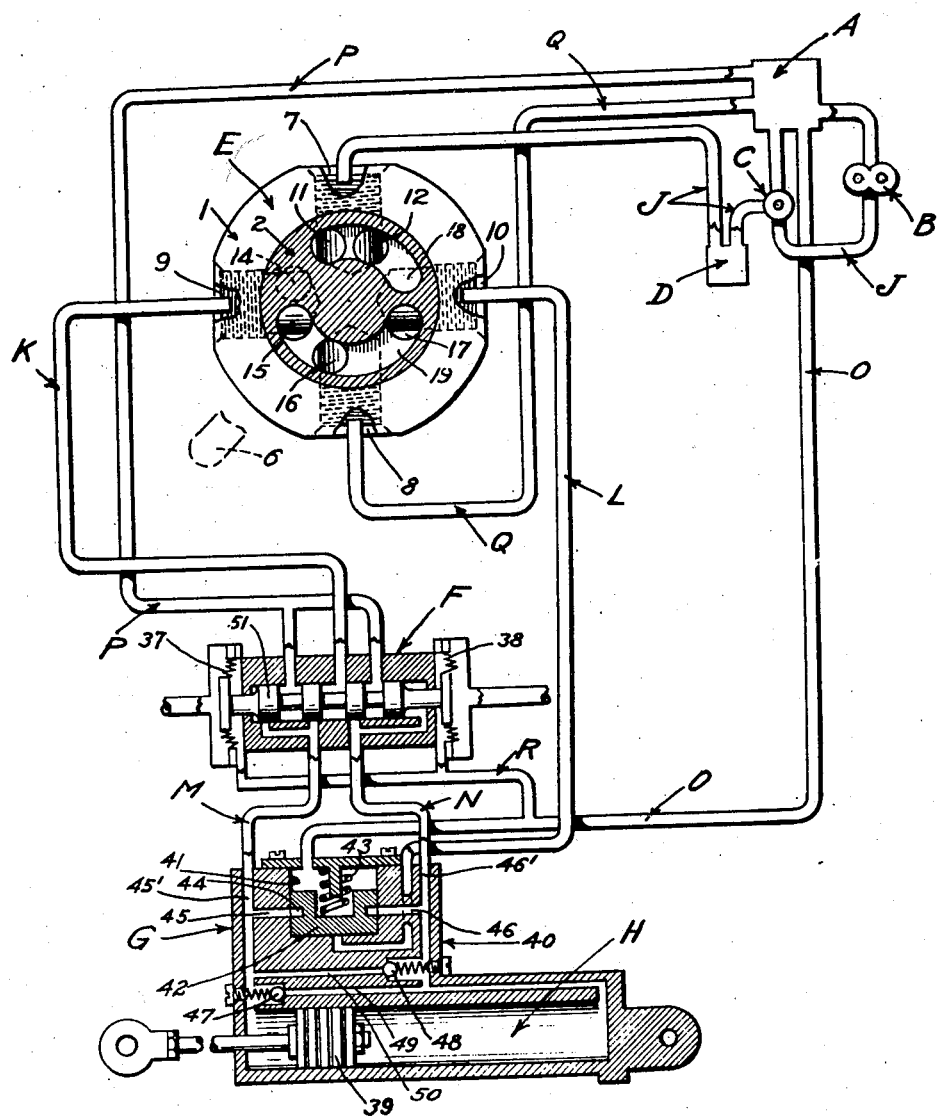

Inventor
DONALD D. PAXTON

Patented Oct. 19, 1948

2,451,575

UNITED STATES PATENT OFFICE 2,451,575

HYDRAULIC SELECTOR VALVE

Donald D. Paxton, Burbank, Calif., assignor to Adel Precision Products Corp., a corporation of California Application February 20, 1946, Serial No. 648,895

1 Claim. (Cl. 60—52)

This invention relates to selector valves for controlling hydraulic systems particularly in aircraft and has for its primary object the provision of a valve of this character which is especially designed for the purpose of improving hydraulic systems embodied in automatic pilot mechanism and other hydraulic systems where it is desired to control the flow of fluid in a similar manner.

In the present day automatic pilot systems, separate and manually operable "on-off" and bleeder valves must be operated in a particular sequence in order to properly control and operate the system. Frequently the pilot manipulates these valves in improper sequence and causes the pressure fluid to become locked whereby the system becomes inoperative, may in some instances be severely damaged and in all cases interferes with proper manual control of the aircraft.

It is the primary purpose of the present invention to provide an improved system and control means in which a single valve unit will replace the separate valves heretofore required and eliminate the possibility of incorrect sequence of operation and the need for special instructions, thereby preventing failure of the system and loss of control of the aircraft and eliminating all of the objections which attended the use of the aforesaid separate valves.

Another object is to provide a control valve such as described which will simplify the arrangement of the fluid lines in an auto-pilot system, reduce the number of said lines and attendant fittings and the weight of the system.

Another object of this invention is to provide a control valve unit in which a simple form of disk valve is constructed and arranged to produce three different flow cycles upon selective movement of an operating handle into three positions within a range of approximately 90° of arc, with the valve members and associated operating means arranged in particularly small compass whereby the valve unit is comparatively small, compact and extremely light as to weight.

A further object is to provide a valve assembly such as described in which a ported disk valve member and a cooperating ported seat member affording connection of a pump or source of pressure with working lines leading to certain hydraulically responsive devices of a particular system, also affording the connection of the worklines to a return line leading to the reservoir of the system, are constructed and arranged to provide a three phase flow of fluid as follows:

1. An "off" phase or cycle in which the operating pressure is shut off from the system and in which a by-pass valve in the system is open so that the hydraulic motor may be moved freely while the aircraft is under manual control.

2. The "bleed" cycle or phase in which pressure fluid from the pump will circulate freely through the system without hydraulic response of the hydraulic motor in the system, for the purpose of "warming up" the fluid preliminary to actual hydraulic operation of said motor, and to bleed out any air entrapped in the system, while also making it possible to manually operate the controls which are connected to said motor.

3. The "on" cycle or phase in which pressure fluid is directed through both working lines for response of the certain hydraulic devices to put the system in readiness for normal automatic pilot operation.

Another object is to provide a control valve assembly of the character described which is constructed and arranged so that it may be moved from "off" position through the "bleed" position to the "on" position, and vice versa, or moved only into the "bleed" position or from "bleed" position into either of the other positions; the said valve providing for a free circulation of the fluid of the system in such manner that a hydraulically driven motor of the system is free to be moved to permit of manual control of the aircraft at any time that the valve is in the "bleed" position or the "off" position.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figs. 12, 13 and 14 are schematic views of my improved valve as embodied in a hydraulic system for operating an automatic pilot mechanism of an aircraft, said views respectively showing the valve and system when operating under the "off," "bleed" and "on" cycles.

Figure 1:
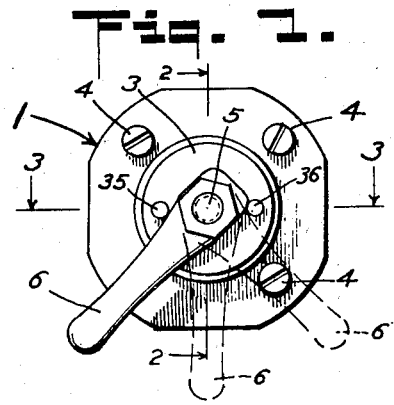
Fig. 1 is a front elevation of a valve embodying the present invention.
Figure 2:
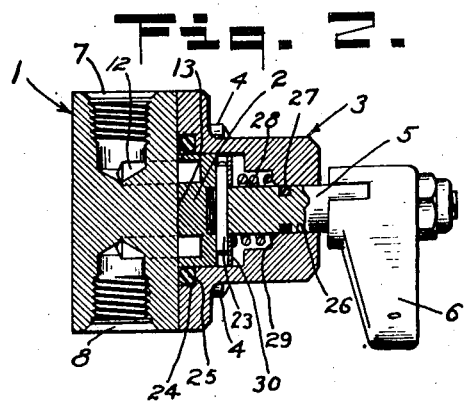
Fig. 2 is a vertical sectional view taken on the line 2—2 of Fig. 1.
Figure 3:
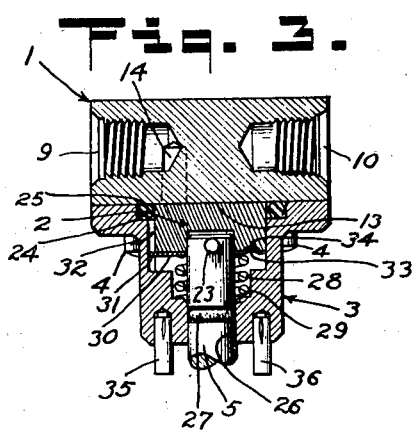
Fig. 3 is a sectional view taken on the line 3—3 of Fig. 1.

As shown in the accompanying drawings, a valve embodying the present invention generally includes a body member 1, a rotary disk valve 2, a cap 3 secured by fastenings 4 to the body so as to enclose the disk valve 2, a rotary shaft 5 for operating the disk valve and a handle 6 fixed to the shaft 5.

In the present instance the valve body 1 is made in the form of a relatively thick circular plate having four bores extending radially inwardly from the periphery of the body and terminating short of the center of the body to provide a pressure fluid intake passage 7, a return passage 8 opposite the passage 7, and opposite pressure service passages 9 and 10 for directing pressure fluid to a transfer valve and to a by-pass valve respectively as will be hereinafter more fully described.

Figure 4:
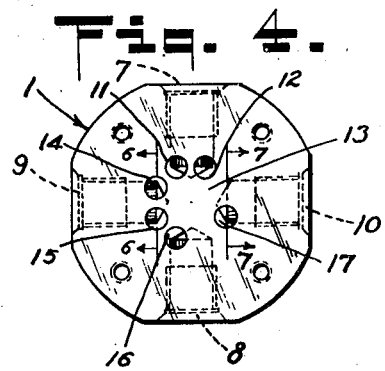
Fig. 4 is an elevational view of the valve body with the valve cap removed.
Figure 6:
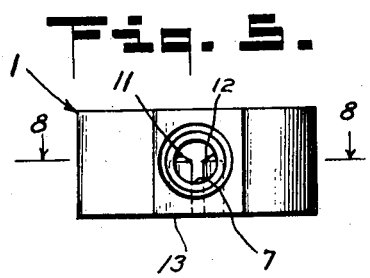
Figs. 6 and 7 are fragmentary elevational views looking toward opposite sides of Fig. 4.
Figure 5:
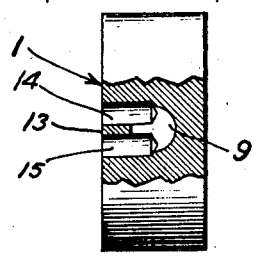
Fig. 5 is a top plan view of the valve body shown in Fig. 4.
Figure 7:
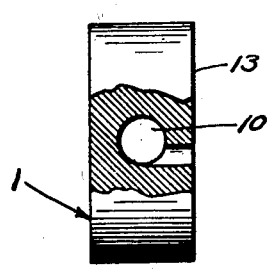
Figure 8:
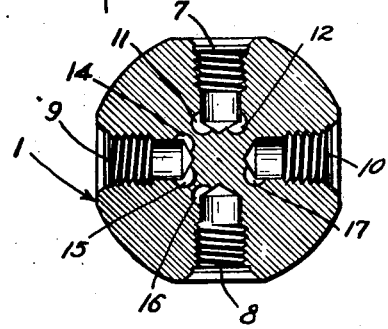
Fig. 8 is a sectional view taken on the line 8—8 of Fig. 5.

As shown in Fig. 4 the valve body 1 is provided with a pair of parallel pressure ports 11 and 12 which extend axially therein from the valve seat face 13 of the body so as to open into the intake passage 7, a similar pair of ports 14 and 15 opening into the service passage 9, and like single ports 16 and 17 which open into the return passage 8 and the other service passage 10 respectively. These "valve seat" ports 11, 12, 14, 15, 16 and 17 are arranged in a circular series in predetermined spaced relation for cooperation with the disk valve 2 to control the flow through the valve unit hereof as will be hereinafter fully described.

Figure 9:
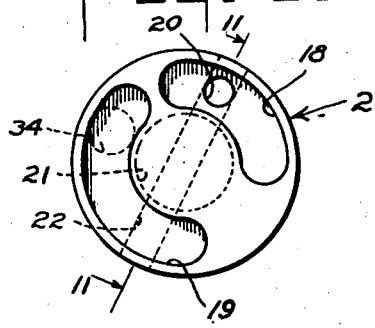
Fig. 9 is a rear elevation of the disk valve.
Figure 10:
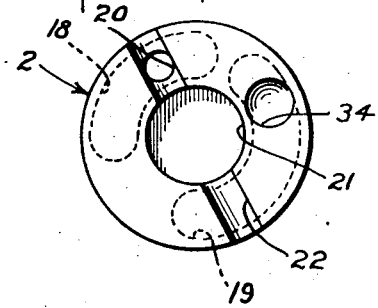
Fig. 10 is a front elevation view of the disk valve.
Figure 11:
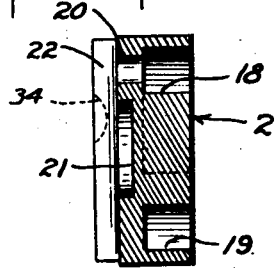
Fig. 11 is a sectional view taken on the line 11—11 of Fig. 9.

With reference to Figs. 9, 10 and 11 it will be seen that the face of the disk valve 2 which is adapted to turn on the seat face 13 of the body 1 is provided with an arcuate recess port 18 and a larger arcuate recess port 19 concentric with but spaced at its ends from the ends of the port 18. A hole 20 is drilled through the disk valve 2 from the bottom of the recess port 18 so that pressure fluid will be effective on both sides of the valve to balance it and assure a proper seating thereof as will be hereinafter more fully described. The outer surface of the disk valve 2 is provided with a circular recess 21 and a transverse slot 22 which latter intersects the recess and is adapted to receive a drive pin 23 carried by the end of the shaft 5, which end is socketed in said recess, whereby the valve will turn with the shaft.

The cap 3 is provided with a groove 24 to accommodate a sealing ring 25 to prevent leakage between the cap and the body. The shaft 5 extends through a bearing portion 26 on the cap and carries a sealing ring 27 to prevent leakage between the shaft and the bearing portion 26. In this connection it should be noted that the entire valve unit is effectively sealed by the two sealing rings 24 and 27. The valve 2 is seated by means of a spring 28 which surrounds the shaft 5 with one end abutting a shoulder 29 on the cap and the other end abutting a detent washer 30 surrounding the shaft and seated on the outer face of the valve 2. At this point it should be noted that inasmuch as the valve 2 is subjected to equal fluid pressure on opposite sides due to the hole 20 through the valve, the full force of the spring 28 is effective to tightly seat the valve against the ported seating face 13 of the valve body 1.

The detent washer 30 has a peripheral projection 31 which fits in a slot 32 in the cap 3 thereby preventing the washer from turning with the valve and shaft while permitting the washer to move axially of the shaft against the action of the spring 28. A spherical detent protuberance 33 is provided on the washer 30 so as to snap into a depression 34 in the outer face of the valve when the latter is in its "bleed" position as otherwise the operator would have difficulty in determining when the shaft 5 has been turned sufficiently to set the valve in its bleed position. This is due to the fact that the handle 6 will contact stop pins 35 and 36 and limit the movement to the valve to assure its being disposed in its "off" and "on" positions which latter positions are at the limits of the movement of the valve, whereas the bleed position is about midway between "off" and "on" positions.

Figure 12:
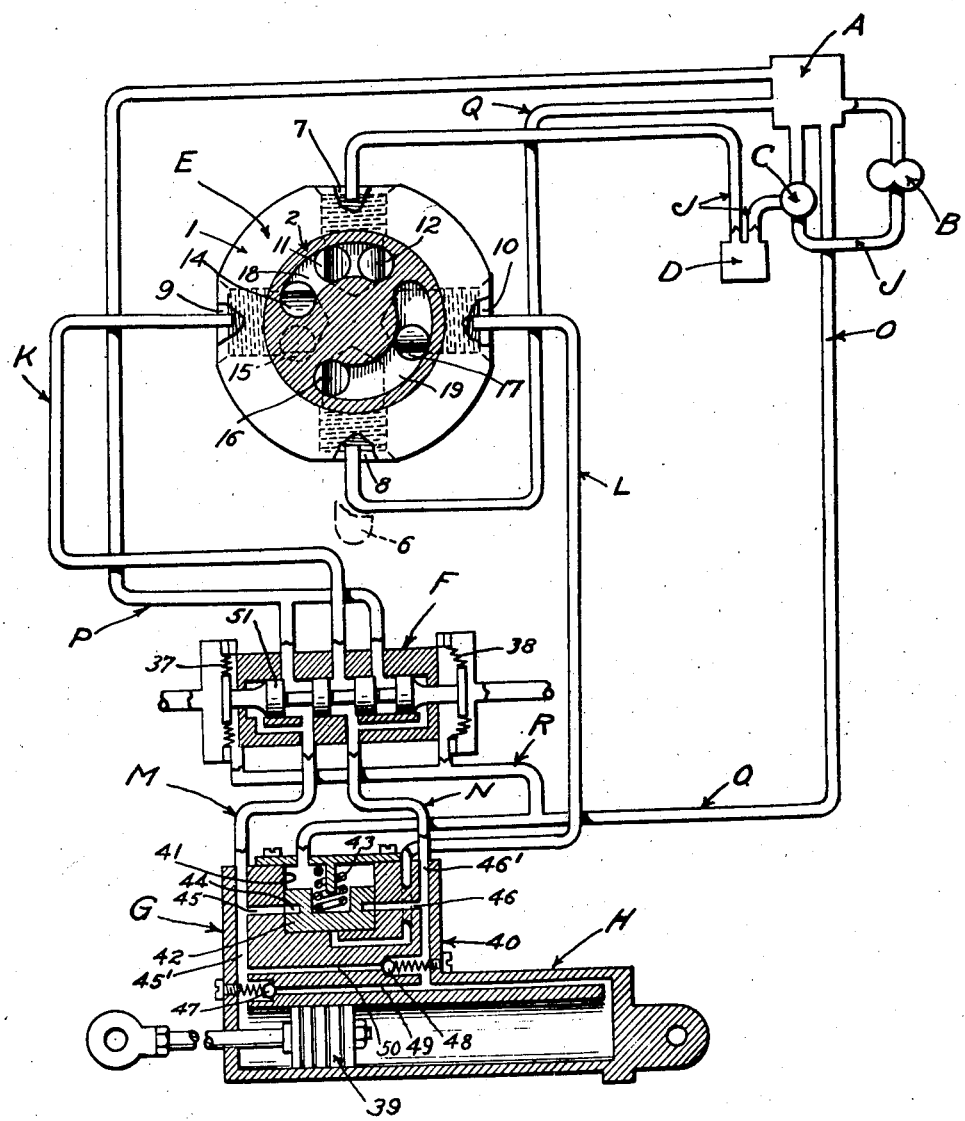
Figure 74:
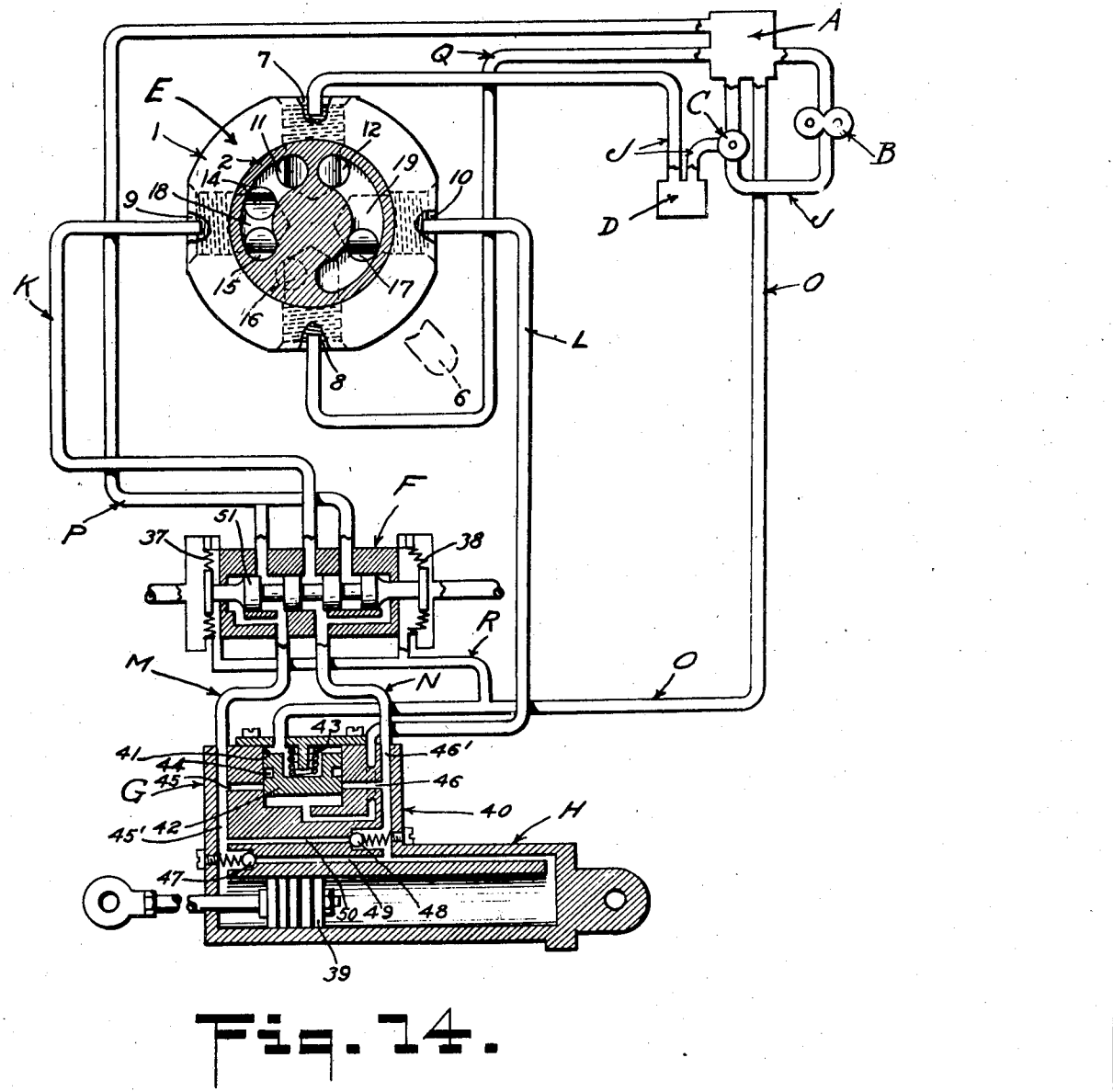

When the handle 6 is in the full line (extreme left) position as shown in Fig. 1 it will rest against the stop pin 35 and the valve 2 will be disposed in its "off" position as shown in Fig. 12. From this position the handle is moved to the right and stopped in its mid dotted position to dispose the valve in "bleed" position or is moved past said "bleed" position into the right hand dotted position to dispose the valve in its "on" position. When the valve 2 reaches the "bleed" position, the detent 33 will snap into the depression 34 and resist turning of the shaft 5 sufficiently to indicate to the operator that the valve is in the "bleed" position as shown in Fig. 13. In moving the valve out of "bleed" position into "on" position shown in Fig. 14 the detent 33 will ride out of the depression 34 in the valve and onto the outer surface of the valve, the spring 28 then yielding to allow axial movement of the washer 30 sufficient to relieve the detent action responsive to a forceful turning of the handle 6 and consequent turning of the shaft 5 and valve 2. When the handle 6 strikes the stop pin 36 the valve 2 will be disposed in the "on" position as shown in Fig. 14.

Figs. 12, 13 and 14 show how the hydraulic system of an automatic pilot mechanism is improved by means of the valve of this invention, said figures showing the valve and system as operating under the "off," "bleed" and "on" cycles respectively. Generally the system includes the reservoir A, pump B, pressure regulator C, filter D, the disk control valve E, the standard transfer valve F now in general use in such systems, a standard by-pass valve G, and a hydraulic cylinder servo-unit H which is adapted to operate aircraft control elements (not shown) in the manner common to automatic pilot systems and which is well known to those skilled in this art.

It should be noted at this point that the showing in Figs. 12, 13 and 14 is but diagrammatic with certain details omitted. As an example, the transfer valve F is controlled by diaphragms 37 and 38 which in turn are controlled by means (not shown) operated responsive to gyroscopic means, also not shown, but which means are parts of standard automatic pilot mechanisms and well known to persons skilled in this art. This transfer valve is also responsive to a follow-up means, not shown, and which performs in a manner well known in the hydraulic art to shut off the pressure fluid flow from the transfer valve responsive to the hydraulic cylinder performing a given operation, for example, adjusting an aircraft surface control back to a neutral position or to any given corrective or stabilizing position.

As shown in Figs. 12, 13 and 14, a pressure line J leads from the pump B to the intake passage 7 in the body 1 of the valve unit E while service lines K and L lead from the service passages 9 and 10 to the transfer valve F and by-pass valve G respectively. Cylinder lines M and N extend from the transfer valve F to the left and right ends of the cylinder H respectively. Return lines O, P and Q lead to the reservoir A from the by-pass valve G, the transfer valve F and the return passage 8 of valve E respectively. Another return line R connected to the diaphragm units 37 and 38, is joined to the adjacent return line O for relieving any fluid that may leak into the transfer valve sides of said diaphragm unit.

When the disk valve 2 is in "off" position as shown in Fig. 12, the smaller recess port 18 thereof is out of registration with the service ports 14, 15 and 17 in the valve body 1 thereby shutting off the flow of pressure fluid through the valve and rendering the system hydraulically inoperative but providing for free movement of the piston 39 in the cylinder H so that the aircraft control elements (not shown) and which are subject to operation responsive to said cylinder may be manually controlled. In this connection it is seen that when the valve 2 is in the "off" position the larger recess port 19 thereof affords communication of the service line ports 15 and 17 with the return port 16 so that any fluid subject to return to reservoir through the valve E may flow freely to the reservoir.

The piston 39 in the cylinder H is free to move responsive to manual flight control of the aircraft when the valve 2 is in "off" position, due to the by-pass valve G being in by-passing position to permit fluid to by-pass around the piston from one end of the cylinder to the other. This by-pass valve includes a body member 40 as here shown mounted on the cylinder H and having a cylinder 41 therein in which a piston valve 42 is reciprocable. A spring 43 holds this valve in by-passing position as shown in Fig. 12 when the valve 2 is in "off" and "bleed" positions. When in by-passing position the piston valve 42 presents an annular by-pass groove 44 therein in registration with ports 45 and 46 in the cylinder 41 which opens into cylinder passages 45' and 46' leading through the body 40 to opposite ends of the cylinder H and the passages 45' and 46' are at their outer ends with the cylinder lines M and N. This provides for the by-passing of the fluid in the cylinder H around the piston. However, when pressure fluid from the valve E is directed through the service line L it enters the cylinder 41 so as to move the piston valve 42 against the action of the spring 43 out of by-passing positions as shown in Fig. 14 and this action takes place only when the valve 2 is in the "on" position. The return line O is connected to the end of the by-pass valve cylinder 41 opposite the end to which the service line L is connected and allows fluid to be returned whereby the piston valve 42 may be hydraulically shifted out of by-passing position.

The cylinder H is provided with spring loaded thermal relief valves 47 and 48 in cross passages 49 and 50 between the cylinder passages 45' and 46'. These relief valves are set to open when a predetermined pressure higher than normal working pressure is created in the cylinder H and associated lines by reason of thermal expansion of the fluid.

The transfer valve F here shown is standard in auto pilot systems and includes a spool valve member 51 which responds to the diaphragms 37 and 38 which in turn are controlled by the gyroscopic components (not shown) of the system, in the usual manner well known to those skilled in the art. Responsive to the diaphragms the transfer valve directs the pressure and return fluid to and from opposite ends of the cylinder H through the lines M and N and the passages 45' and 46' to reciprocate the piston 39 and thus operate the flight control elements (not shown) which are connected in the usual manner with the piston 39.

When the valve E is operated to dispose the valve member 2 in the "bleed" position as shown in Fig. 13 the small recess port 18 in the valve member 2 is brought into registration with both intake ports 11 and 12 and the service port 14 while the larger recess port 19 is brought into registration with the other service port 17 and the return port 16. In moving the valve member 2 from "off" to "bleed" the handle 6 is moved to the right of the full line position shown in Fig. 1 to the middle dotted position at which times the detent means 30, 33 and 34 resists turning of the valve and indicates to the operator that the valve is in proper bleed position. At this time pressure fluid will flow through the valve E into service line K, thence through the transfer valve F which, for example, will direct fluid through line N into passage 46. The pressure fluid at this time is shut off at the valve E from the line L leading to the by-pass valve G so that the by-pass piston valve 42 will remain in by-passing position. Consequently pressure fluid will flow from passage 46' through the by-pass groove 44 into passage 45' and return to the reservoir through line M, valve F and line P. Service line L is open to the return line Q through the valve E at this time. With the valve E in "bleed" position a free circulation of the fluid in system takes place under pump pressure to "warm up" the fluid and remove any entrapped air. At the same time the piston 39 may be freely moved so that the aircraft may be manually controlled without being interfered with by the then hydraulically inoperative servo-motor or cylinder H.

When the valve E is operated to move it from "bleed" position to the "on" position the valve member 2 takes the position shown in Fig. 14, the handle 6 having been turned to right hand dotted position shown in Figs. 1 and 14 until it is stopped by the stop pin 35. In this position of the valve member 2, the recess port 18 therein registers with the pressure port 11 and both service ports 14 and 15 so that pressure fluid will pass out through the service passage 9 in the body 1, through line K to the transfer valve where, depending on the position of said valve as determined by the diaphragms 37 and 38 and the gyro-mechanism (not shown) said valve will direct pressure fluid to one end or the other of the cylinder H. As shown in Fig. 14 the valve F is positioned to direct fluid through cylinder line N and passage 46' to the right end of cylinder H. At this time the larger recess port 19 in the valve 2 is in position to direct pressure fluid from the other intake port 12 to the other service port 17 from which latter the pressure fluid passes through the service passage 10, service line L, to the cylinder 41 of the by-pass valve G, thereby moving the by-pass piston valve 42 out of by-passing position so that the cylinder H is subject to hydraulic operation to move the control element of the aircraft which may be connected to piston 39. Return fluid from the cylinder H passes through the passage 45', line M, transfer valve F and return line P to the reservoir A, while fluid is also returned from the by-pass valve cylinder 41 through the line O to the reservoir. Thus it is seen that when the valve E is in "on" position the system is entirely under control of the gyro-operated transfer valve F to operate the cylinder H to control the flight of the aircraft automatically.

It should be noted that due to the construction of the valve E and the manner in which it is connected in the auto-pilot hydraulic circuit hereof, it is impossible to cause malfunction of the system and consequent damage thereto and in all cases interference with manual operation of the aircraft flight control elements. The valve may be moved from "off" position directly to "on" position through the "bleed" position without stopping at "bleed" position, and vice versa and may be moved from "bleed" position into either "off" or "on" position and in no instance of its operation will the system be subject to interference with manual control of the aircraft except of course when the system is intentionally operated under gyroscopic control as when the valve is in "on" position.

While I have shown and described a specific embodiment of my invention, I do not limit myself to the exact details of construction set forth, and the invention embraces such changes, modifications and equivalents of the parts and their formation and arrangement as come within the purview of the appended claim.

I claim:

In a hydraulic system which includes a source of supply of pressure fluid, a hydraulic motor comprising a cylinder in which a piston is reciprocable, a transfer valve through which pressure fluid may be directed for application to either end of said cylinder and through which return fluid may pass, and a spring loaded by-pass valve normally disposed by its spring in a position to afford the by-passing of fluid from one end of the cylinder to the other and adapted to be moved by pressure fluid out of by-passing position; the improvement which consists in providing in said system a selector valve including a valve body member having on one face thereof a seat for a disk valve member and being provided with a pressure intake passage, a return passage, a pair of service passages, a pair of pressure ports extending from said intake passage and opening on said seat, a single return port extending from said return passage and opening on said seat, a pair of service ports extending from one of said service passages and opening on said seat, a single service port extending from the other service passage and opening on said seat, and a rotary disk valve member mounted on said seat and having a pair of recess ports in the face thereof opposed to said seat; a pressure line from said source to said intake passage, a service line connecting one of said service passages with said transfer valve, a second service line connecting the other service passage with said by-pass valve for supplying fluid for moving said valve out of by-passing position, a return line connecting said return port through said return passage to said source, and means for turning said valve member to selectively dispose it in a position in which one of the recess ports will be in communication only with said pair of pressure ports while the other recess port affords communication of one of the pair of service ports and said single service port with said return port; into a second position in which said one recess port will establish communication of said pair of pressure ports with the other of the service ports of said pair, while the other recess port affords communication between said single service port and said return port; and into a third position in which said one recess will establish communication between one of said pressure ports and both of the service ports of the pair thereof while the other recess port will establish communication of the other of said pressure ports with said single service port.

DONALD D. PAXTON.

REFERENCES CITED

The following references are of record in the file of this patent:

UNITED STATES PATENTS

| Number | Name | Date |
|---|---|---|
| 1,507,973 | Mohn | Sept. 9, 1924 |
| 1,752,934 | Townsend | Apr. 1, 1930 |
| 2,179,179 | Fischel | Nov. 7, 1939 |
| 2,334,346 | Mueller | Nov. 16, 1943 |
| 2,344,913 | Ager | Mar. 21, 1944 |
| 2,424,288 | Severy | July 22, 1947 |